Jan. 17, 1939.　　　W. P. DIDUSCH　　　2,143,910
RIBBON GUT AND METHOD OF USING THE SAME
Filed March 30, 1934　　　2 Sheets-Sheet 1

INVENTOR.
BY WILLIAM P. DIDUSCH,
Ellis S. Middleton ATTORNEY.

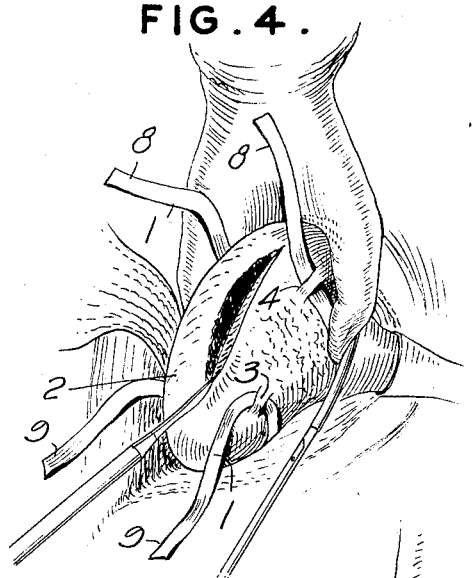
FIG.4.
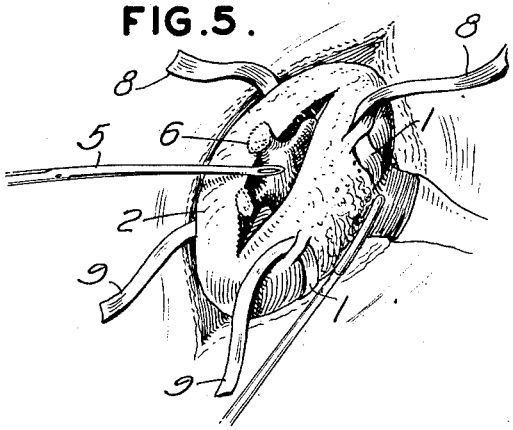
FIG.5.
FIG.6.
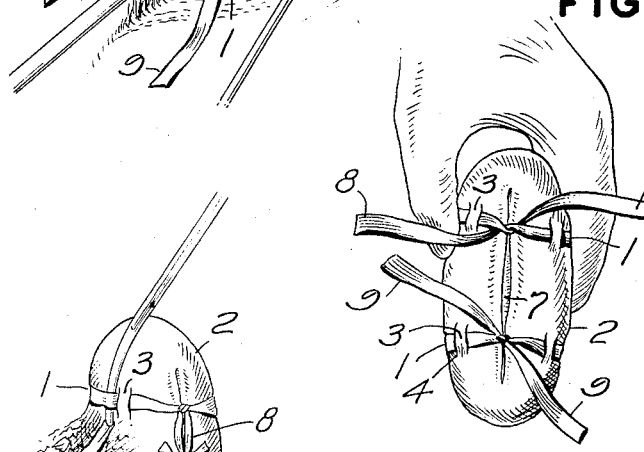
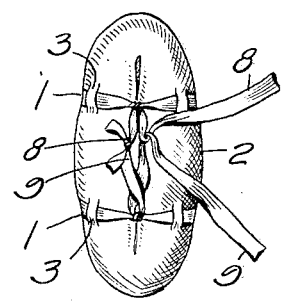
FIG.7.
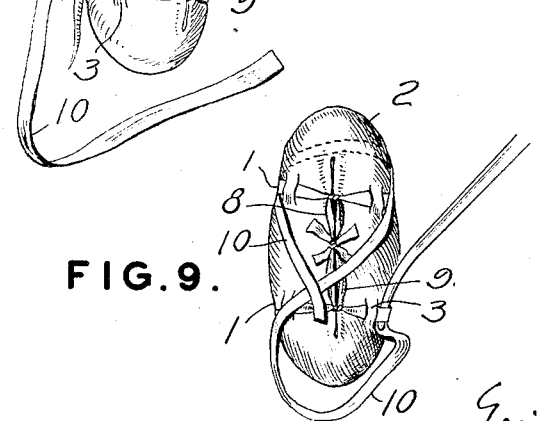
FIG.8.
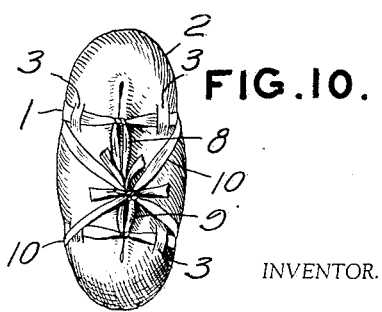
FIG.10.
FIG.9.
INVENTOR.
BY WILLIAM P. DIDUSCH,
ATTORNEY.

Patented Jan. 17, 1939

2,143,910

UNITED STATES PATENT OFFICE 2,143,910

RIBBON GUT AND METHOD OF USING THE SAME

William P. Didusch, Baltimore, Md., assignor to Davis & Geck, Inc., Brooklyn, N. Y., a corporation of New York Application March 30, 1934, Serial No. 718,282

7 Claims. (Cl. 128—335.5)

The present invention relates to ribbon gut and methods of using the same.

The principal object of the invention is to provide a surgical ligature or suture in the form of a ribbon or tape of absorbable animal tissue.

Another important object of the invention relates to the manner of use of such a ligature or suture in repairing wounds or incisions of internal organs.

It has long been known that extensive destruction to living animal tissue has followed nephrotomy or kidney wounds or incisions.

Most of this renal impairment can be attributed to the placing of sutures through the kidney or other living tissue to obtain approximation of the edges of the incision and at the same time to control haemorrhage. As applied to kidney repair, sutures thus placed must necessarily compress the vessels supplying the cortical and medullary substances of the kidney and thereby produce an ischaemia with resultant necrosis and scarification.

The above undesirable effects necessarily flow from the use of sutures in the form of a strand or cord, whether the repair is made by completely passing such a ligature around an organ where such is possible as in the case of a kidney, or whether repair is made by passing the suture through the tissue by means of a needle and pulling the stitches tight to cause approximation of the incision edges.

It is an important object of this invention, therefore, to provide a ligature or suture for more or less general application, not open to the above objections, which will distribute pressure over a large area, which will have sufficient durability as to offer confidence that an adequate, lasting, supporting structure may be afforded until such time as the healing wound has gained its own strength, which will be absorbable by the living tissues and which may have other desirable characteristics, as more fully hereinafter pointed out.

The invention in its broadest aspect contemplates the provision of a surgical ligature or suture in the form of a flat ribbon or tape of absorbable tissue.

The invention also contemplates a manner of use thereof as applied to an internal organ, that is, where the organ after repair may be completely encased in living tissue. Such manner of use contemplates the wrapping of the gut or tape around the injured part of the organ just as one would wrap a parcel with ribbon, and pulling the ends together to approximate the edges of the wound and secure the ligature ends together as by means of tying.

The invention further consists in the novel ligature or suture and method of use more fully hereinafter described and shown in the accompanying drawings.

In the drawings—

Fig. 4 shows the kidney incised with the ribbon gut in place.

Fig. 5 shows the removal of staghorn calculus from the kidney pelvis.

Fig. 6 illustrates the tying of the loose ends of the ribbon gut together, holding it firmly in position.

Fig. 7 illustrates a manner of tying together the ends of two separate ribbons.

Fig. 8 illustrates the manner of drawing a third length of ribbon gut under a length already applied to reinforce the transverse ligatures.

Fig. 9 illustrates drawing of the tape under the lower transverse bend on the opposite side.

Fig. 10 shows the three lengths of ribbon gut tied, and repair of the kidney complete.

Referring now with particularity to the drawings, there is shown in the several figures at 1 a ligature or suture of absorbable animal tissue in the form of a ribbon or tape. While I do not wish to be limited strictly to dimensions, yet it has been found desirable to use a ribbon 45 to 65 centimeters in length, 1.8 to 2.0 centimeters in width, and in thickness no more than that of fine rice paper. In animal experiments it will probably be found desirable to make these ribbons one-half the above width, that is, approximately 0.8 centimeter, but in the operations on humans, full width may be used.

The ligature or suture itself may be made of any absorbable animal tissue such for instance as sheep intestine prepared as in the usual manner of preparing sutures except, however, that the twisting thereof into a strand or cord is omitted. These sutures or ligatures may be packed in alcohol or other sterilizing material in the usual type of aseptic catgut tube, and when so packed have been found to remain thoroughly pliable. Though such sutures show a tendency to dry rapidly when exposed to air, and when dry are no longer adequately pliable, yet they may be readily softened again by moistening with physiological saline.

Numerous experiments have been conducted with such ribbon gut or ligatures, both on animals and humans, and an illustration of its manner of use will now be detailed, as applied to kidney repair.

In both rabbit and dog, the renal pedicle is relatively long and because of this the kidney may be readily marsupialized. The exposure then, can be limited to a single muscle splitting incision approximately 6 centimeters in length, through which the kidney is easily deliverable. The approach in both animals is retroperitoneal; in the dog there is a reflection of visceral peritoneum on the anterior medial third of the kidney, which, however, may be easily peeled off. With moderate care, therefore, it is possible in both animals to deliver the kidney completely, free of adjacent tissue and without injury to the peritoneum. In the human cases, approach has been made through the usual lumbar route.

Figure 1:
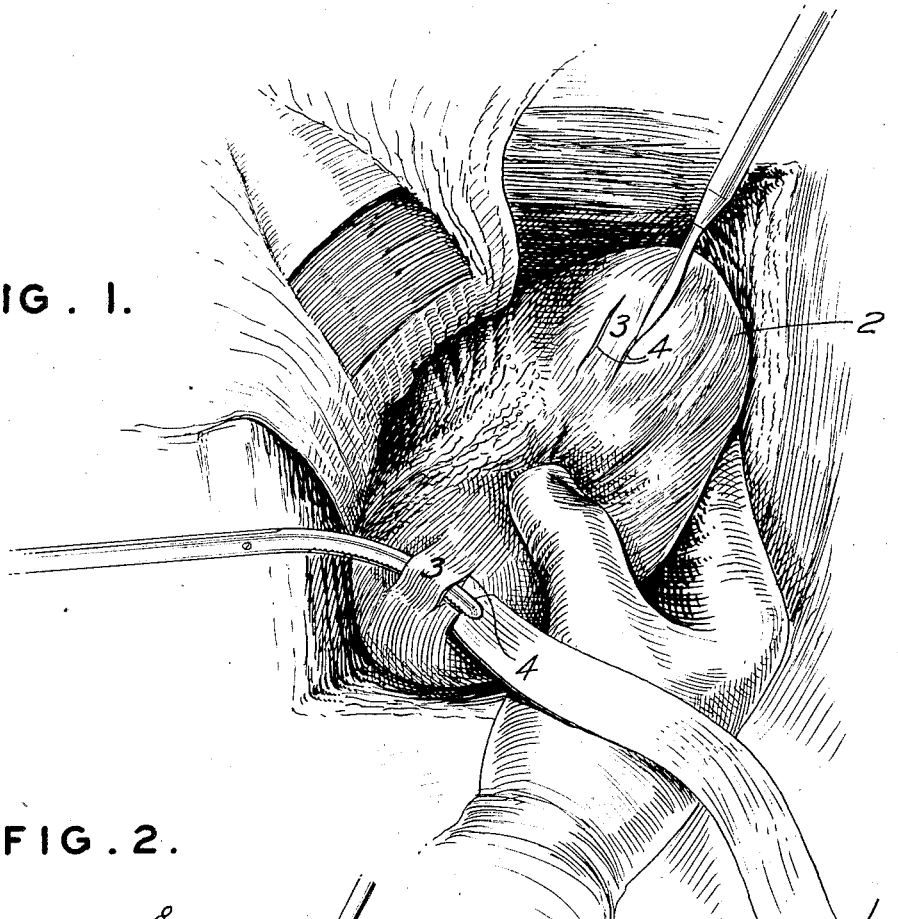
Fig. 1 illustrates an exposed kidney, the manner of cutting loops in the capsule thereof and drawing the ribbon gut through the loop thus made.
Figure 2:
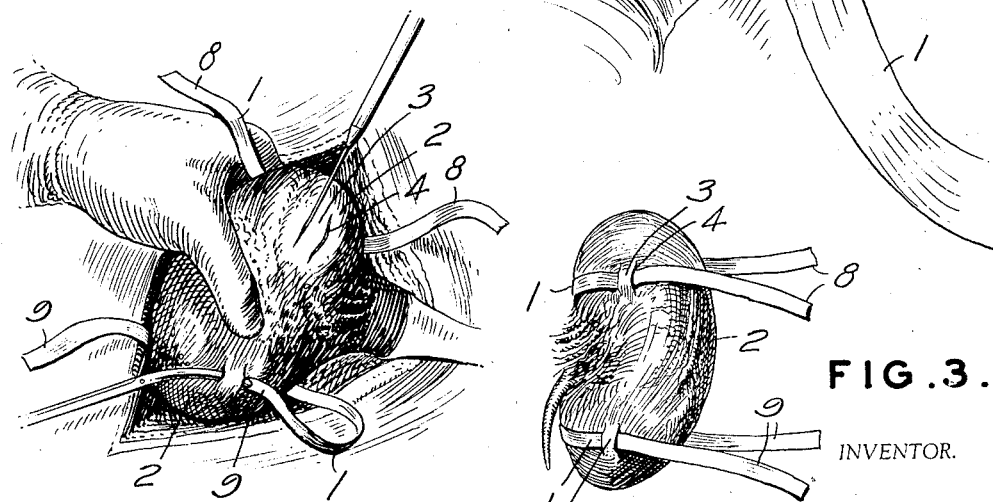
Fig. 2 illustrates the making of the same sort of a loop on the opposite side of the kidney, and the threading of the ribbon gut therethrough.
Figure 3:
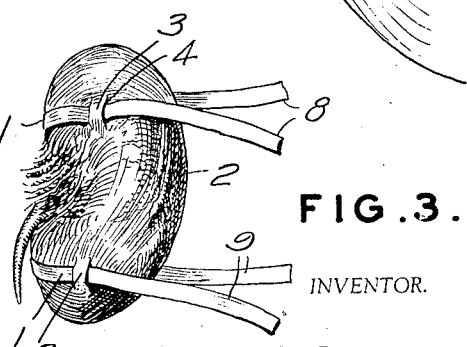
Fig. 3 illustrates a kidney having ribbon gut passed through loops made on each side of both poles of the capsule and ready to be tied.

With the kidney 2 completely exposed, straps of kidney capsule 3, each about 0.5 centimeter in width, are constructed on anterior and posterior surfaces at both upper and lower poles by incising as at 4 with a scalpel. If the flat surfaces of the kidney be visualized as divided in equal parts by the line drawn through the hilus, the straps would lie at a point approximately at the center of each half. This is shown generally in Fig. 1. The straps 3 may be produced by two parallel incisions 4 in the kidney capsule, 0.4 centimeter apart and about 1.0 centimeter in length, the intervening bridge capsule being stripped away gently by undermining it with a clamp. The direction of these incisions is parallel to a line drawn from hilus to pole. The actual length of the strap 3 is decided, of course, by the width of the tape to be used. Through these straps at either pole is threaded a flat tape, ribbon suture or ribbon gut 1 and the belly of the tape is looped beneath the pole, the free ends, then, meeting across the lateral, convex border of the kidney proper (Fig. 4). Having made these preparations for closure, nephrotomy incision is made through the avascular line of Broedel either with the scalpel or by a strand of catgut. A clamp 5 for grasping the calculus 6 is thrust through into the pelvis and when the stone has been removed, closure can be completed. A small piece of freshly cut fat 7 may be introduced into the wound and the cut edges thoroughly approximated by tying the free ends of the suture tape 8 together across the line of incision, and the free ends of a second suture tape 9 similarly. To eliminate the chance of the sutures slipping off a pole of the kidney, the long ends of the sutures 8 and 9 may be then tied together as shown in Fig. 7. In the event that this does not entirely close the wound or control the bleeding, a third tape 10, in the form of a figure of eight may be placed beneath either pole and crossed and tied at the midpoint of the convex border immediately over the wound and beneath the tapes 8 and 9 in the manner shown in Figs. 8, 9 and 10. The wound may then be closed in layers with plain catgut.

From the above, it will be clear that an absorbable gut suture material which is flat and broad like a ribbon can be so placed about an organ as adequately to approximate the cut surfaces of nephrotomy incision and to control all bleeding completely. This type of closure of incisions is designed to eliminate the through and through suture. Clinical cases have emphasized that this procedure is not only possible but is permanent in its effect and that the result of such procedure is compatible with life.

Examination of the specimens removed at autopsy demonstrate that renal wounds closed after this manner heal in an entirely satisfactory way with a minimum reaction as far as can be noted on gross examination. There is no gross alteration of size or consistency in the specimen.

Suture material of the above type though absorbable in vitro in 4 to 5 days, has been found unabsorbed up to periods of 23 days. Since the material is non-chromicized, this fact strongly suggests that the nephrotomy wounds are tightly closed and do not leak. If there had been seepage, the plain gut would obviously have been absorbed in an interval of this length. Further, the durability of the material offers confidence that an adequate, lasting, supporting structure is afforded until such time as the healing would have gained its own strength. In the autopsy specimens of kidney repair, the straps have been entirely intact and the gut ribbons showed no slippage over the poles of the kidney.

While the above technique has been described with particularity to the repair of kidney wounds, yet it is to be understood that this is merely illustrative and is not to be taken in a limiting sense as similar wounds of spleen and liver may be likewise prepared. As a matter of fact, this material and its method may be generally applied to the outside of any internal organ which is capable of being embedded or completely surrounded with living tissue.

It is to be understood that while this ribbon gut is primarily a ligature, yet it may be used as a suture, and hence the words "ligature and/or suture" in the specification and claims, are to be read with this import.

I claim:

1. A method of closing an incision in a living animal organ which consists in wrapping a ribbon of absorbable material around said organ, approximating the edges of the incision and securing the ends of the ribbon to maintain the incision edges in approximation.

2. The method of claim 1, with the additional step of embedding the organ and ribbon in living tissue to permit complete absorption of the ribbon and healing of the incision.

3. A method of closing an incision in an elongated living animal organ which consists in wrapping a ribbon of absorbable material around one pole of said organ, twisting the two ends of the ribbon together to approximate the edges of the adjacent part of the incision, similarly wrapping the other pole of the organ with a second similar ribbon, twisting the two ends of the second ribbon together to approximate the edges of the adjacent part of the incision, and then tying the two ends of the first ribbon to the two ends of the second ribbon respectively, to approximate the intermediate portions of the incision edges.

4. The method of claim 3, with a third ribbon wrapped around said organ in the form of a figure of eight.

5. The method of claim 3, with a third similar ribbon wrapped around said organ in the form of a figure of eight, portions of the third ribbon lying beneath the first two ribbons.

6. The method of claim 3, with a third similar ribbon wrapped around said organ in the form of a figure of eight, the ends of the third ribbon being tied over the approximate edges of the incision.

7. A method of closing an incision in a kidney which consists in wrapping a ribbon of absorbable material around said kidney, approximating the edges of the incision, securing the ends of the ribbon to maintain the edges of the incision in approximation, and embedding the kidney and ribbon in living tissue to permit complete absorption of the ribbon and healing of the incision.

WILLIAM P. DIDUSCH.